Patented Mar. 11, 1941

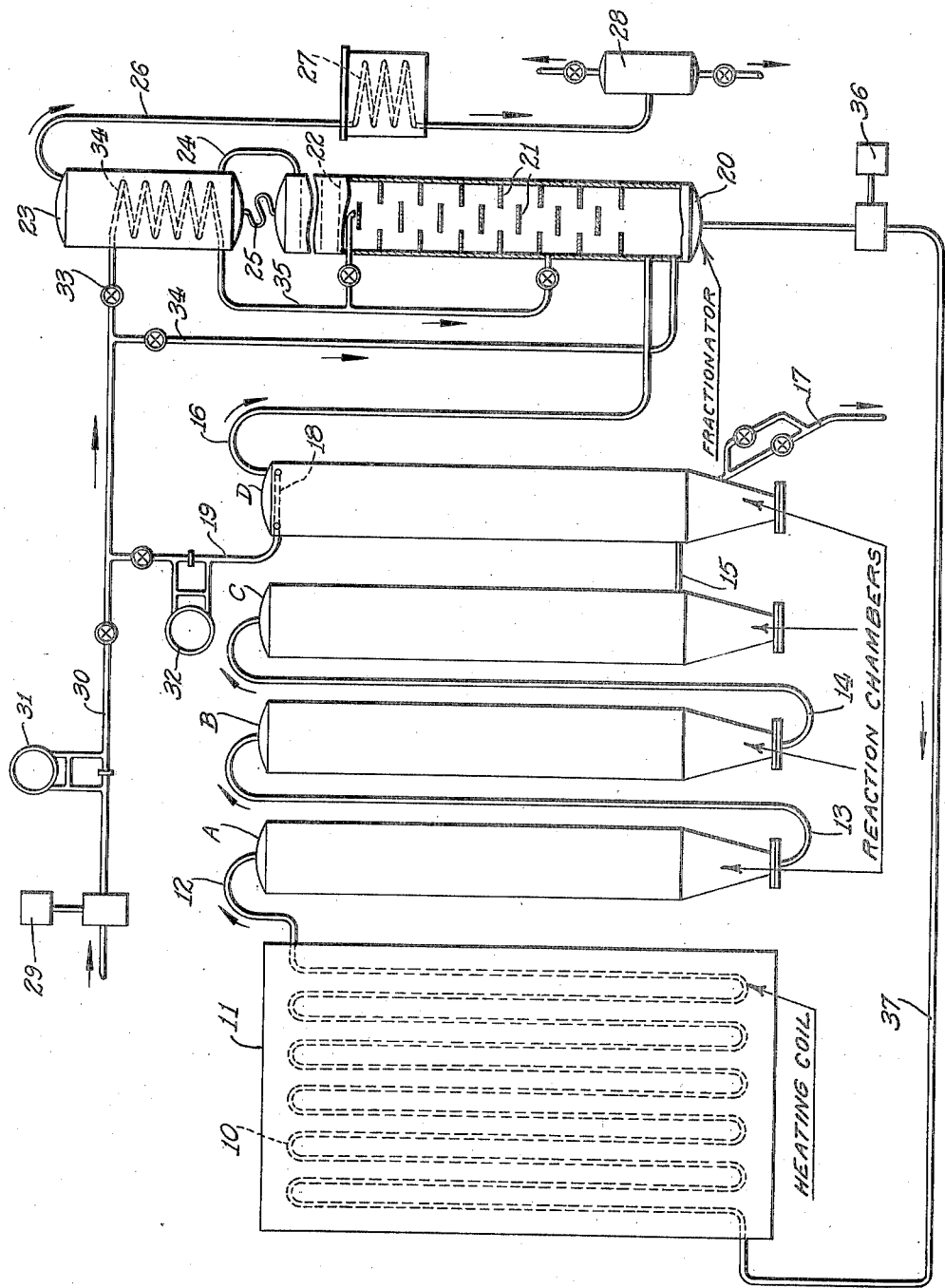

2,234,910

UNITED STATES PATENT OFFICE 2,234,910

CRACKING HYDROCARBON OILS

Joseph M. Barron, Tulsa, Okla., assignor to The Texas Company, New York, N. Y., a corporation of Delaware Application June 21, 1939, Serial No. 280,264

6 Claims. (Cl. 196—58)

This invention relates to the cracking of hydrocarbon oils for the production of motor fuel and is concerned primarily with certain novel improvements in carrying on the cracking reaction in a plurality of reaction chambers.

The invention contemplates a process wherein hydrocarbon oil is heated to a cracking temperature in a heating coil or passageway of restricted cross-section and the heated oil delivered to a plurality of cracking chambers. In this way the necessary heat for accomplishing the cracking may be put into the oil during its flow through the heating coil and the cracking reaction greatly prolonged by the passage of the heated products through a plurality of cracking chambers. In such a type of operation it is desirable to maintain cracking temperatures in the reaction chambers adequate to support such a high rate of cracking as is conducive to the formation of high anti-knock gasoline constituents. The temperature required is of the order of 850° F. or higher. A difficulty presented in this type of operation is the avoidance of coking while maintaining the high temperature required. As the products undergoing cracking proceed through the several reaction chambers, the tendency toward coking becomes more pronounced, even though the temperature in the latter reaction chambers of the series may drop somewhat. This increased coking tendency is no doubt due to the coking in a later stage of the cracking reaction of polymer products of cracking formed in an earlier stage. An attempt to remove potential coke-forming constituents by withdrawing residue from the several reaction chambers does not satisfactorily solve the problem because the very act of making the separation into a vapor component and a residual liquid component involves the formation of a more or less quiescent pool of residue in each of the chambers from which residue is withdrawn which produces a pronounced tendency toward coking.

In accordance with my invention the products undergoing cracking are passed in succession through one or more reaction chambers from which no separate withdrawal of vapors and liquid is made and the entire products of reaction pass to a final reaction chamber in which the products of cracking are separated into vapors and residue while a cooling spray of oil is applied to the wall of this final reaction chamber. In practicing the invention the products undergoing cracking pass rapidly through the reaction chamber or chambers from which no separate withdrawal of vapors and liquid is made, the products passing through such chamber or chambers without the accumulation of any pool of liquid therein. These chambers may advantageously be held at the maximum temperatures possible without coke formation, the flow of the products and the avoidance of the accumulation of any pool or pools of liquid being relied on to avoid coking in these chambers. In the final or separating reaction chamber in which the products are at the most advanced stage of cracking and in which separation into vapors and residue is taking place, the cooling spray of oil on the wall of the reaction chamber serves to prevent the formation of coke deposits without producing any material lowering in the temperature of the mass of products undergoing reaction therein.

I have discovered that charging stock in critical quantity may be sprayed on the wall of the separating reaction chambers so as to prevent the formation of coke deposits while at the same time avoiding the inclusion of any substantial portion of such charging stock in the residue withdrawn from the reaction chamber. In accordance with the invention charging stocks, such as ordinary gas oil stocks which may contain a certain proportion of heavy ends which, due to their high boiling point, cannot be distilled at normal pressures without decomposition (generally speaking, stocks containing constituents boiling in excess of 700° F.), may be sprayed on the wall of the separating reaction chamber in a quantity in a given unit of time of the order of 1%–3% of the quantity of the upwardly rising vapors therein expressed in terms of liquid oil to form a liquid film thereon which effectually prevents the formation of coke deposits, without the inclusion of any substantial portion of the spraying oil in the residue withdrawn from the chamber. Apparently when used in such critical quantity substantially all of the constituents of the spraying oil are vaporized, with probably some cracking, under the partial pressure conditions obtaining in the chamber; at any rate there is no inclusion of any substantial portion of the spraying oil in the withdrawn residue.

The critical quantity of spraying oil used may be expressed as involving a ratio of barrels per hour of cooling oil to the surface area of the reaction chamber to which the cooling film is applied as of the order of 1:50–200. When employing the charging stock spray in the quantity of the order stated in relation to the volume of upwardly rising vapors expressed in terms of liquid oil and to the effective surface area covered by the film not only is the formation of coke deposits prevented while maintaining the mass of products in the reaction chamber at temperatures of the order of 850° F., but also there is no substantial loss of the valuable charging stock constituents in the cracked residue withdrawn from the cracking chamber.

In a preferred embodiment of the invention the course of the stream of products undergoing cracking in the reaction chamber or chambers from which no separate vapor and liquid components are withdrawn is in a downward direction while in the separating reaction chamber the separated vapors pass upwardly from the separating residue. In the down-flow operation the liquid constituents will pass through a reaction chamber more quickly than the vaporous constituents so that a longer time of reaction may be imparted to the vaporous constituents and over cracking or coking of the liquid constituents may be avoided, while in the separating reaction chamber an effective separation of the liquid component from the vapor component is effected by withdrawing residue from the lower portion of the chamber and withdrawing vapors from an upper portion.

In order to explain the invention more fully, reference is now made to the accompanying drawing which is a diagrammatic elevation of apparatus adapted for practicing the invention.

The apparatus illustrated includes a heating or cracking coil 10 communicating with a series of cracking chambers A, B, C, D. The heating coil 10 is disposed in a suitable furnace 11 adapted to heat the oil in transit in the coil 10 to a desired cracking temperature. The furnace may advantageously be so arranged as to heat the flowing oil predominantly by radiant heat while it is being subjected to the cracking temperature and may, for example, be of the well-known deFlorez type.

The cracking chambers A, B, C, D are vertically disposed and the lower portion of each of the chambers is advantageously of inverted conical or frusto-conical form, as indicated in the drawing. The reaction chambers are insulated to prevent or retard heat loss. A transfer line 12 serves to transfer the heated oil from the heating coil 10 to the top of the reaction chamber A; a transfer line 13 extends from the bottom of reaction chamber A to the top of reaction chamber B; a transfer line 14 extends from the bottom of reaction chamber B to the top of reaction chamber C; and a transfer line 15 extends from a lower portion of reaction chamber C to a lower portion of reaction chamber D. The reaction chamber D serves as a separator as well as a cracking chamber in which vapors are separated from residue and is provided with a vapor line 16 which leaves from the top or upper portion of the chamber and a residue or tar line 17 which extends from the bottom or a low point in the chamber, preferably from the conical portion thereof. A spray ring 18 is disposed in the top or upper portion of the reaction chamber to which spray ring oil is supplied by a line 19. The spray ring is disposed adjacent the wall of the reaction chamber and adapted to spray liquid against the wall.

The vapor line 16 extends to a fractionating tower 20. The tower may advantageously include a lower section having disc and doughnut trays 21 and an upper section having bubble trays 22. The tower may conveniently be equipped with a reflux condenser 23 with which it communicates by means of a vapor line 24 and a reflux or backtrap line 25. A vapor line 26 extends to a condenser coil 27 and a distillate receiver or gas separator 28 is provided for receiving the distillate.

Charging stock is introduced by a pump 29 through a charging line 30 having a flow meter 31. The line 19 which supplies oil to spray ring 18 is a branch line of the charging line 30 and is equipped with a flow meter 32. The charging line 30 may advantageously be provided with additional branches 33 and 34. The branch 33 extends to a heat exchange coil 34 disposed in the reflux condenser 23. A line 35 serves to conduct the preheated oil from coil 34 to the tower 20, the line 35 being preferably provided with one or more branches so that the oil may be admitted to a selected point or points in the tower. Branch line 34 extends directly to a lower point in the tower 20. A hot oil pump 36 is provided for drawing liquid from the tower 20 and forcing it through recycle line 37 to the heating coil 10.

In practicing the invention with the apparatus illustrated, charging stock, such as gas oil containing 10%–30% of constituents boiling above 700° F., is introduced into the fractionating tower 20, a definite portion of such charging stock being diverted through line 19 to the spray ring 18 for spraying the wall of the reaction chamber D. Combined unvaporized charging stock and condensate is drawn from the tower 20 and directed by the hot oil pump 36 to the heating coil 10 wherein the oil is subjected to cracking temperatures generally in excess of 900° F. and subjected to cracking. The heated products undergoing reaction pass to the top of reaction chamber A wherein they flow downwardly and pass thence to reaction chambers B and C in succession in each of which the products flow downwardly. By reason of the down-flow in reaction chambers A, B and C, the liquid components which descend more rapidly than the vaporous components, are subjected to a shorter time of reaction than the vapors and the rapidly flowing liquid and vaporous constituents are subjected to a rapid rate of cracking without the accumulation of any pool of liquid in the reaction chambers and without such an extent of coke formation as to impede the process. The liquid and vaporous constituents undergoing cracking pass from the bottom of chamber C to the separating reaction chamber D wherein the cracking is continued at a rapid rate and wherein separation of vapors from residue takes place. No substantial body of liquid is maintained in the reaction chamber D, all of the liquid residue being rapidly withdrawn with preferably only sufficient liquid in the bottom portion of the chamber to insure a liquid seal over the tar line. The quantity of spraying oil introduced through line 19 is carefully regulated so that it will approximate, in a given unit of time, about 1%–3% of the volume of upwardly rising vapors in the chamber, as expressed in terms of liquid oil, and the barrels per hour of spraying oil in relation to the surface area expressed in square feet of the cracking still D over which the film flows is maintained at a ratio of 1:50–200, to thereby prevent coking on the wall of the cracking still. The temperature in reaction chamber A approximates 900° F. with some drop in temperature in the succeeding reaction chambers B, C and D and with the temperature in reaction chamber D not being permitted to fall materially below 850° F. and being preferably maintained at 850° F. or higher. The residue withdrawn from chamber D is conveniently passed to a tar stripper (not shown). The reaction chambers are maintained under superatmospheric pressure, such as 200–600 pounds. The separated vapors pass to the fractionator 20 and the cooling applied in the reflux exchanger 23 is regulated to take off a distillate of desired end point.

In a typical example of the invention a gas oil charging stock, about 85% of which distilled off at 700° F., was used under the following conditions of operation:

| | |
|---|---|
| Total fresh charge | 134 bbls./hr. |
| Charge to spray ring | 5 bbls./hr. |
| Recycle rate | 392 bbls./hr. |
| Residue drawn from reaction chamber D | 45 bbls./hr. |
| Vapors in chamber D | 374 bbls./hr. (liq. vol.) |
| Heating coil outlet | 915° F. |
| Reaction chamber A | 895° F. |
| Reaction chamber B | 880° F. |
| Reaction chamber C | 870° F. |
| Reaction chamber D | 863° F. |
| Pressure in reaction chambers | 400 lbs. |

In this example of the invention the charge of 5 barrels per hour to the spray ring constituted approximately 1.4% of the vapor flow through the reaction chamber D (expressed in liquid barrels). In another example of the invention, with similar charging rates and conditions of operation, a charge of 3 barrels per hour was directed to the spray ring constituting approximately 0.8% of the vapors (expressed in liquid barrels), and in another example a charge of 9 barrels per hour was directed to the spray ring constituting approximately 2.6% of the vapors (expressed in liquid barrels). In all of these typical operations there was no inclusion of the introduced spraying oil in the residue withdrawn from the reaction chamber D.

In these examples of the invention reaction chambers having a length of 40 feet and a diameter of 5 feet were employed, with a wall area in reaction chamber D covered by the cooling film of approximately 580 square feet. In using the 3 barrels per hour of spray oil the ratio of the barrels per hour of spray oil to the surface area is 1:194. In using the 9 barrels per hour of spray oil the ratio is 1:65.

The practice of the invention has resulted in greatly prolonging the length of runs; for example, the length of runs has been increased from an average length of run of 660 hours when not using the invention to an average length of 920 hours when practicing the invention. Moreover, the practice of the invention makes possible an increase in capacity of a given cracking unit by enabling an increase in the cracking per pass, and also enables an increase in the charging rate.

While I have described a particular embodiment of the invention for the purpose of illustration, it should be understood that various modifications and adaptations thereof, occurring to one skilled in the art, may be made within the spirit of the invention as set forth in the appended claims.

I claim:

1. In the conversion of higher boiling hydrocarbon oils into lower boiling products, the process that comprises passing the oil through a heated coil of restricted cross-section wherein the oil is heated to a cracking temperature, delivering the resultant heated products at cracking temperature to a series of enlarged reaction chambers through which the products undergoing reaction pass in succession and in the last of which separation of vapors from residue takes place, passing the products from one reaction chamber to the succeeding reaction chamber and withdrawing separated residue from the last reaction chamber at such rates as to prevent the accumulation of any substantial body of liquid in any of said reaction chambers, causing the products undergoing reaction in each of said reaction chambers, except said last one, to flow downwardly while causing the separated vapors to flow upwardly in said last reaction chamber, maintaining said reaction chambers under superatmospheric pressure of the order of 200–600 pounds and at temperatures of the order of 850° F. by means of the heated products flowing from said heating coil, applying a cooling spray of gas oil to an upper portion of the wall of said last reaction chamber in quantity in a given unit of time of the order of 1%–3% of the quantity of upwardly rising vapors therein expressed in terms of liquid oil to maintain a down-flowing film thereon and removing the separated vapors from said last reaction chamber and subjecting them to fractionation to separate a desired distillate product from heavier condensate.

2. In the conversion of higher boiling hydrocarbon oils into lower boiling products, the process that comprises passing the oil through a heated coil of restricted cross-section wherein the oil is heated to a cracking temperature, delivering the resultant heated products at cracking temperature to the upper portion of the first of a series of enlarged down-flowing reaction chambers, passing the liquid and vaporous products undergoing reaction downwardly in each of said reaction chambers, withdrawing the products from the bottom of a preceding chamber of said series of reaction chambers and passing the products so removed to the upper portion of a succeeding chamber of said series of reaction chambers without the accumulation of any pool of liquid in any chamber of said series, removing the liquid and vaporous products from a lower portion of the last reaction chamber of said series and delivering them to a lower portion of a separating reaction chamber wherein separation of vapors from residue takes place and wherein the separated vapors flow upwardly, withdrawing separated residue from said separating reaction chamber at a rate adequate to prevent the accumulation of any substantial body of liquid therein, maintaining aforesaid reaction chambers under superatmospheric pressure of the order of 200–600 pounds and at temperatures of the order of 850° F. by means of the heated products flowing from said heating coil, applying a cooling spray of gas oil to an upper portion of the wall of said separating reaction chamber in quantity in a given unit of time of the order of 1%–3% of the quantity of upwardly rising vapors therein expressed in terms of liquid oil to maintain a downflowing film thereon, removing the separated vapors from said final reaction chamber and subjecting them to fractionation to separate a desired distillate product from heavier condensate and cycling said heavier condensate to said heating coil.

3. In the conversion of higher boiling hydrocarbon oils into lower boiling products, the process that comprises passing the oil through a heated coil of restricted cross-section wherein the oil is heated to a cracking temperature, delivering the resultant heated products at cracking temperature to a series of enlarged reaction chambers through which the products undergoing reaction pass in succession and in the last of which separation of vapors from residue takes place, passing the products from one reaction chamber to the succeeding reaction chamber and withdrawing separated residue from the last reaction chamber at such rates as to prevent the accumulation of any substantial body of liquid in any of said reaction chambers, maintaining said cracking chambers under superatmospheric pressure of the order of 200–600 pounds and at cracking temperatures of the order of 850° F. by means of the heated products flowing from said heating coil, applying a cooling spray of oil comprising constituents boiling above 700° F. to an upper portion of the wall of said last reaction chamber in a quantity in a given unit of time of the order of 1%–3% of the quantity of the upwardly rising vapors therein expressed in terms of liquid oil to maintain a down-flowing film thereon and removing the separated vapors from said last reaction chamber and subjecting them to fractionation to separate a desired distillate product from heavier condensate.

4. In the conversion of higher boiling hydrocarbon oils into lower boiling products, the process that comprises passing the oil through a heated coil of restricted cross-section wherein the oil is heated to a cracking temperature, delivering the resultant heated products at cracking temperature to a series of enlarged reaction chambers through which the products undergoing reaction pass in succession and in the last of which separation of vapors from residue takes place, passing the products from one reaction chamber to the succeeding reaction chamber and withdrawing separated residue from the last reaction chamber at such rates as to prevent the accumulation of any substantial body of liquid in any of said reaction chambers, maintaining said reaction chambers under superatmospheric pressure of the order of 200–600 pounds and at cracking temperatures of the order of 850° F. by means of the heated products flowing from said heating coil, applying a cooling spray of oil comprising constituents boiling above 700° F. to an upper portion of the wall of said last reaction chamber in a quantity in a given unit of time of the order of 1%–3% of the quantity of the upwardly rising vapors therein expressed in terms of liquid oil and in quantity having a ratio expressed in barrels per hour of the order of 1:50–200 to the surface area to which said film is applied as expressed in square feet to maintain a down-flowing film on the wall of said last reaction chamber, and removing the separated vapors from said last reaction chamber and subjecting them to fractionation to separate a desired distillate product from heavier condensate.

5. In the conversion of higher boiling hydrocarbon oils into lower boiling products, the process that comprises passing the oil through a heated coil of restricted cross-section wherein the oil is heated to a cracking temperature, delivering the resultant heated products at a cracking temperature to a series of reaction chambers through which the products undergoing reaction flow downwardly in succession to the last reaction chamber of the series from which reaction chamber all the products of reaction are withdrawn and in which separation of vapors from residue takes place, passing the products from one reaction chamber to the succeeding reaction chamber and withdrawing separated residue from the last reaction chamber at such rates as to prevent the accumulation of any substantial body of liquid in any of said reaction chambers, maintaining said reaction chambers under superatmospheric pressure of the order of 200–600 pounds and at temperatures of the order of 850° F. by means of the heated products flowing from said heating coil, applying a cooling spray of gas oil to an upper portion of the wall of said last reaction chamber to maintain a down-flowing film thereon in quantity having a ratio expressed in barrels per hour of the order of 1:50–200 to the surface area to which said film is applied as expressed in square feet and removing the separated vapors from said last reaction chamber and subjecting them to fractionation to separate a desired distillate product from heavier condensate.

6. In the conversion of higher boiling hydrocarbon oils into lower boiling products, the process that comprises passing the oil through a heated coil of restricted cross-section wherein the oil is heated to a cracking temperature, delivering the resultant heated products at cracking temperature to a series of enlarged reaction chambers through which the products undergoing reaction pass in succession and in the last of which separation of vapors from residue takes place, passing the products from one reaction chamber to the succeeding reaction chamber and withdrawing separated residue from the last reaction chamber at such rates as to prevent the accumulation of any substantial body of liquid in any of said reaction chambers, causing the products undergoing reaction in each of said reaction chambers, except said last one, to flow downwardly while causing the separated vapors to flow upwardly in said last reaction chamber, maintaining said reaction chambers under superatmospheric pressure of the order of 200–600 pounds and at temperatures of the order of 850° F. by means of the heated products flowing from said heating coil, applying a cooling spray of oil comprising constituents boiling above 700° F. to an upper portion of the wall of said last reaction chamber in a quantity in a given unit of time of the order of 1%–3% of the quantity of the upwardly rising vapors therein expressed in terms of liquid oil to maintain a down-flowing film on said wall, and removing the separated vapors from said last reaction chamber and subjecting them to fractionation to separate a desired distillate product from heavier condensate.

JOSEPH M. BARRON.